United States Patent
Katz et al.

(10) Patent No.: US 10,248,218 B2
(45) Date of Patent: Apr. 2, 2019

(54) SYSTEMS AND METHODS OF DIRECT POINTING DETECTION FOR INTERACTION WITH A DIGITAL DEVICE

(71) Applicant: Eyesight Mobile Technologies Ltd., Herzliya (IL)

(72) Inventors: Itay Katz, Tel Aviv (IL); Amnon Shenfeld, Herzliya (IL)

(73) Assignee: Eyesight Mobile Technologies, Ltd., Herzliya (IL)

( * ) Notice: Subject to any disclaimer, the term of this patent is extended or adjusted under 35 U.S.C. 154(b) by 0 days.

(21) Appl. No.: 15/583,958

(22) Filed: May 1, 2017

(65) Prior Publication Data

US 2017/0235376 A1    Aug. 17, 2017

Related U.S. Application Data

(63) Continuation of application No. 14/130,359, filed as application No. PCT/IL2013/050230 on Mar. 12, 2013, now Pat. No. 9,671,869.

(60) Provisional application No. 61/610,116, filed on Mar. 13, 2012.

(51) Int. Cl.
*G06F 3/01* (2006.01)
*G06F 3/03* (2006.01)
*G06F 3/0346* (2013.01)

(52) U.S. Cl.
CPC .............. *G06F 3/017* (2013.01); *G06F 3/011* (2013.01); *G06F 3/013* (2013.01); *G06F 3/0304* (2013.01); *G06F 3/0346* (2013.01)

(58) Field of Classification Search
None
See application file for complete search history.

(56) References Cited

U.S. PATENT DOCUMENTS

| | | |
|---|---|---|
| 6,147,678 A | 11/2000 | Kumar |
| 6,283,860 B1 | 9/2001 | Lyons et al. |
| 6,531,999 B1 | 3/2003 | Trajkovic |
| 8,947,351 B1 | 2/2015 | Noble |
| 9,671,869 B2 * | 6/2017 | Katz ................ G06F 3/017 |
| 2002/0097218 A1 | 7/2002 | Gutta et al. |
| 2005/0248529 A1 | 11/2005 | Endoh |
| 2008/0174551 A1 | 7/2008 | Ishibashi |
| 2009/0110235 A1 * | 4/2009 | Marti ................ G06F 3/011 |
| | | 382/103 |

(Continued)

OTHER PUBLICATIONS

International Search Report for PCT International Application No. PCT/IL2013/050230, dated Jun. 25, 2013.

(Continued)

*Primary Examiner* — Claire X Pappas
*Assistant Examiner* — Benjamin X Casarez
(74) *Attorney, Agent, or Firm* — Finnegan, Henderson, Farabow, Garrett & Dunner LLP

(57) ABSTRACT

A method of recognizing an aimed point on a plane is provided. Images captured by one or more image sensor are processed for obtaining data obtaining data indicative of location of at least one pointing element in the viewing space and data indicative of at least one predefined user's body part in the viewing space; using the obtained data an aimed point on the plane is identified. In case it is determined that a predefined condition is met a predefined command and/or message is executed.

20 Claims, 9 Drawing Sheets

(56) References Cited

U.S. PATENT DOCUMENTS

| | | | |
|---|---|---|---|
| 2011/0074918 A1* | 3/2011 | Klappert | G06F 3/0346 348/43 |
| 2011/0137727 A1* | 6/2011 | Chung | G06F 3/0346 705/14.55 |
| 2011/0260965 A1 | 10/2011 | Kim et al. | |
| 2011/0267265 A1 | 11/2011 | Stinson | |
| 2012/0179408 A1* | 7/2012 | Goto | G06F 3/0346 702/104 |
| 2012/0206333 A1 | 8/2012 | Kim | |
| 2012/0229377 A1 | 9/2012 | Kim | |
| 2013/0055120 A1 | 2/2013 | Galor | |
| 2013/0321271 A1* | 12/2013 | Bychkov | G06F 3/013 345/158 |
| 2016/0179205 A1* | 6/2016 | Katz | G06F 3/013 345/156 |

OTHER PUBLICATIONS

Cheng K., "Direct interaction with large displays through monocular computer vision", University of Sydney, School of Information Technologies; Retrived from the internet: URL:http://hdl.handle.net/2123/5331, Oct. 1, 2008.

* cited by examiner

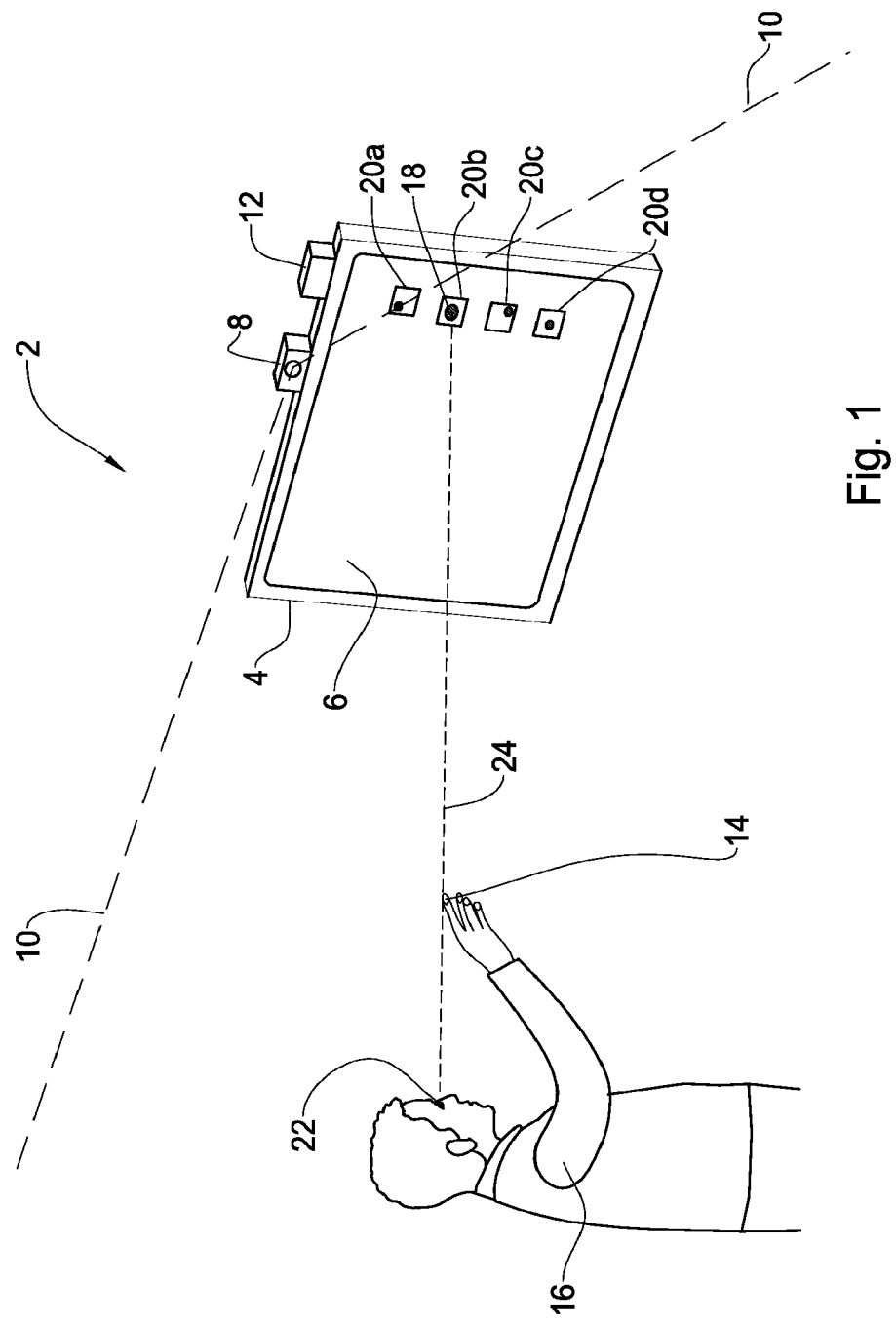

SYSTEMS AND METHODS OF DIRECT POINTING DETECTION FOR INTERACTION WITH A DIGITAL DEVICE

This application is a continuation of U.S. patent application Ser. No. 14/130,359, filed Dec. 31, 2013, which is a U.S. national stage of PCT International Application No. PCTIIL2013/050230, filed Mar. 12, 2013, which claims the benefit of U.S. Provisional Application No. 61/610,116, filed Mar. 13, 2012, the contents of which are incorporated herein by reference in their entirety.

FIELD OF THE INVENTION

This invention relates to user interfaces and to devices including a user interface.

BACKGROUND

Attempts have been made to implement hand gesture recognition, using optical sensors for use in inputting commands to a device. Gesture recognition requires identifying a body part, such as a hand, in each of a plurality of imagers in a video stream.

For example, gesture-based systems have been known to identify hand gestures in a video stream. The gesture is classified for determining an input into a related electronic device. The received input can be used for controlling various aspects of the respective system.

SUMMARY OF THE INVENTION

According to one aspect of the presently disclosed subject matter there is provide a method of recognizing an aimed point on a plane the method comprising: obtaining at least one image of a viewing space of an image sensor;

processing the at least one image by at least one processor operatively connected to the image sensor and obtaining data indicative of location of at least one pointing element in the viewing space; obtaining data indicative of at least one predefined user's body part in the viewing space; and determining by the at least one processor, a point or area on the plane, using the data indicative of the location of the at least one pointing element and the data indicative of the location of at least one predefined user's body part, thus yielding an aimed point on the plane; determining, while obtaining data indicative of location of at least one pointing element in the viewing space that a predefined condition is met; and executing a predefined command and/or message associated with the aimed point.

In some cases the method according to this aspect of the presently disclosed subject matter can optionally comprise one or more of the following features, in any desired combination or permutation.

i. Wherein the method further comprises: displaying on the plane at least one graphical element; identifying by the at least one processor a given graphical element from the at least one graphical element displayed on the plane, using data indicative of the location of the aimed point on the plane.

ii. wherein determining the aimed point on the plane further comprises: identifying the at least one predefined body parts of the user; the at least one body part including at least one of: face of the user; and predefined facial parts of the user; identifying the at least one pointing element; determining location of the at least one body parts within the viewing space, thus yielding a first location; determining a location of the at least one pointing element within the viewing space, thus yielding a second location; determining at least one viewing ray correlated with the first location and the second location; and determining the aimed point as a point on the plane associated with the intersection of the at least one viewing ray with the plane.

iii. wherein the determining of the first location comprises: determining two dimensional location of the at least one body part; estimating distance of the at least one body parts from the plane; and wherein the determining of the second location comprises: determining two dimensional location of the at least one pointing element; and estimating distance of pointing element from the first location.

iv. wherein the determining of the first location comprises: determining two dimensional location of the at least one body part; estimating distance of the at least one body parts from the plane; and wherein the determining of the second location comprises: determining two dimensional location of the at least one pointing element; and estimating distance of pointing element from the plane.

v. wherein at least one of, the estimation of the distance of the at least one predefined body part from the plane; and the estimation of the distance of the pointing element from the first location, is performed using data stored in a data-repository.

vi. wherein the estimation of the distance of the at least one body parts from the plane is performed using data indicative of the distance between two or more facial parts of the user.

vii. wherein the estimation of the distance of pointing element from the first location is performed using data with respect to at least one of: height of the user; estimated proportions of the user's body; estimated distance of the user from the plane; and multiple distance values, each distance value representing recorded distance between at least one pointing element and a predefined body part of a respective user during a pointing gesture.

viii. wherein at least one of, the determination of the first location; and the second location, is performed using information obtained by the image sensor and a depth sensor.

ix. wherein a resolution of the depth sensor is less than the resolution of the image sensor.

x. wherein the second location is determined as the location of the pointing element at point P' in the viewing space where the pointing element is closest to the plane during a pointing gesture.

xi. wherein the method further comprises determining the location of the pointing element at point P' using location features extracted from the motion of the pointing element during the pointing gesture.

xii. Wherein the method further comprises a calibration process comprises: displaying on the plane a calibration sequence comprises at least one graphical elements; for each given graphical element: identifying the at least one pointing element in the viewing space; determining at least one viewing ray connecting the given graphical element, the at least one pointing element and the predefined body part of a user; determining a respective location of the at least one of: the at least one pointing element; and the predefined user's body part; and storing the respective location in a data-repository in association with the given graphical element.

xiii. wherein the calibration further comprises: generating a calibration map indicative of an association between a plurality of locations on the plane and a respective distance of the pointing element from the at least one predefined user's body part.

xiv. Wherein the method further comprises determining the aimed point using data in the calibration map.

xv. Wherein the method further comprises the calibration sequence includes at least one graphical element whose selection is required to switch a device operatively connected to the at least one image sensor and the at least one processor, from standby mode to active mode and/or unlock the device.

xvi. Wherein the method further comprises determining the aimed point on the plane using at least one of a first type of features; and a second type of features; wherein the first type of features include features with respect to the motion path of the pointing element during a pointing gesture, and the second type of features include features with respect to at least one candidate plane.

xvii. wherein the first type of features include a collection of selected position data component of the pointing element during the pointing gesture, which comply with a predefined criterion; the method further comprises: for each given position data component in the collection of selected position data, determining a respective viewing ray; the respective viewing ray extending from the location of the at least one predefined user's body part, through the location of the at least one pointing element, and intersecting the plane, thus yielding a respective candidate plane; wherein the location of the at least one pointing element corresponds to the given position data component; determining an overlapping area between the respective candidate planes; determining the aimed point using data indicative of the overlapping area.

xviii. Wherein the method further comprises: displaying a pointing visual effect on the plane; detecting a motion path of the pointing element in the viewing space; altering at least one characteristic of the displayed pointing visual effect in correlation with the motion path of the pointing element, thereby providing data indicative of the location of the aim point on the plane during the pointing gesture.

xix. wherein the altering of the at least one characteristic of the pointing visual effect includes at least one of: reducing the size of the pointing visual effect as the distance between the pointing element and the plane is reduced; and increasing the size of the pointing visual effect as the distance between the pointing element and the plane is increased.

xx. wherein the pointing visual effect is displayed when a predefined pointing visual effect condition is met.

xxi. wherein the predefined condition is that the pointing element points at the given graphical element displayed on the display for at least a predefined amount of time.

xxii. wherein the predefined condition is that the pointing element has performed a predefined gesture.

xxiii. Wherein the method further comprises: identifying a predefined first gesture performed by the pointing element; identifying the given graphical element responsive to the first gesture; identifying a predefined second gesture performed by the pointing element; and executing a command and/or message responsive to the second gesture; wherein the command and/or message is associated with the given graphical element; and wherein the second gesture is identified before, during or after the first gesture.

xxiv. wherein the at least one predefined user's body parts are user's eyes.

xxv. wherein the plane is a display.

According to another aspect of the presently disclosed subject matter there is provided a device, comprising: at least one image sensor operatively connected to at least one processor; the at least one image sensor is configured to obtain at least one image of a viewing space; the at least one processor is configured to: process the at least one image and obtain data indicative of location of at least one pointing element in the viewing space; obtain data indicative of at least one predefined user's body part in the viewing space; and determine by the at least one processor, a point or area on the plane, using the data indicative of the location of the at least one pointing element and the data indicative of the location of at least one predefined user's body part, thus yielding an aimed point on the plane; determine, while obtaining data indicative of location of at least one pointing element in the viewing space that a predefined condition is met; and execute a predefined command and/or message associated with the aimed point.

According to another aspect of the presently disclosed subject matter there is provided a user interface operatively connectable to a device for enabling inputting commands to the device, comprising: at least one image sensor operatively connected to at least one processor; the at least one image sensor is configured to obtain at least one image of a viewing space; the at least one processor is configured to: process the at least one image and obtain data indicative of location of at least one pointing element in the viewing space; obtain data indicative of at least one predefined user's body part in the viewing space; and determine by the at least one processor, a point or area on the plane, using the data indicative of the location of the at least one pointing element and the data indicative of the location of at least one predefined user's body part, thus yielding an aimed point on the plane; determine, while obtaining data indicative of location of at least one pointing element in the viewing space that a predefined condition is met; and execute a predefined command and/or message associated with the aimed point.

According to another aspect of the presently disclosed subject matter there is provided a program storage device readable by machine, tangibly embodying a program of instructions executable by the machine to perform the method of recognizing an aimed point on a plane, the method comprising: obtaining at least one image of a viewing space of an image sensor; processing the at least one image by at least one processor operatively connected to the image sensor and obtaining data indicative of location of at least one pointing element in the viewing space; obtaining data indicative of at least one predefined user's body part in the viewing space; and determining by the at least one processor, a point or area on the plane, using the data indicative of the location of the at least one pointing element and the data indicative of the location of at least one predefined user's body part, thus yielding an aimed point on the plane; determining, while obtaining data indicative of location of at least one pointing element in the viewing space that a predefined condition is met; and executing a predefined command and/or message associated with the aimed point.

According to another aspect of the presently disclosed subject matter there is provided a computer program code containing instructions for causing a processor to perform operations of a method of recognizing an aimed point on a plane, the operations comprising: obtaining at least one image of a viewing space of an image sensor; processing the at least one image by at least one processor operatively connected to the image sensor and obtaining data indicative of location of at least one pointing element in the viewing space; obtaining data indicative of at least one predefined user's body part in the viewing space; and determining by the at least one processor, a point or area on the plane, using the data indicative of the location of the at least one pointing element and the data indicative of the location of at least one predefined user's body part, thus yielding an aimed point on the plane; determining, while obtaining data indicative of location of at least one pointing element in the viewing space that a predefined condition is met; and executing a predefined command and/or message associated with the aimed point.

According to certain embodiments of the presently disclosed subject matter the computer program code is embodied on a computer readable medium.

The device, user interface, program storage device and computer program code according to the different aspects of the presently disclosed subject matter mentioned above can optionally comprise one or more of the features (i-xxv) above, in any desired combination or permutation mutatis mutandis.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 1 shows a system in accordance with the presently disclosed subject matter;

In the drawings and descriptions set forth, where it seems appropriate, identical reference numerals indicate those components that are common to different embodiments or configurations.

DETAILED DESCRIPTION

Figure 2A:
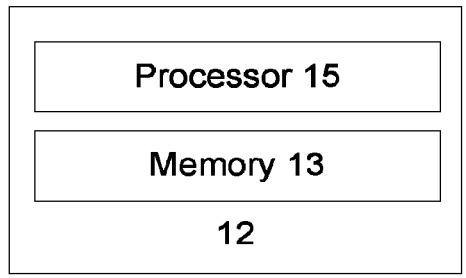
FIG. 2a shows a functional block diagram schematically illustrating a processing unit in accordance with the presently disclosed subject matter.

Unless specifically stated otherwise, as apparent from the following discussions, it is appreciated that throughout the specification discussions utilizing terms such as "obtaining", "processing", "obtaining", "determining", "executing" or the like, include action and/or processes of a computer that manipulate and/or transform data into other data, said data represented as physical quantities, e.g. such as electronic quantities, and/or said data representing the physical objects.

System 2 described herein comprises or is otherwise connected to a computer. The term "computer" should be expansively construed to cover any kind of electronic device with data processing capabilities, including, by way of non-limiting example, a personal computer, a server, a computing system, a communication device, or a processor. The processor can be for, example, one or more of a general purpose processor, a DSP (digital signaling processor), or a GPU (graphical processing unit), configured to run one or more software programs. Alternatively the processor may be dedicated hardware, an application-specific integrated circuit (ASIC). As yet another alternative, the processor 6 may be a combination of dedicated hardware, an application-specific integrated circuit (ASIC), and any one or more of a general purpose processor, a DSP (digital signaling processor), and a GPU (graphical processing unit).

The operations in accordance with the teachings herein may be performed by a computer specially constructed for the desired purposes or by a general purpose computer specially configured for the desired purpose by a computer program stored in a computer readable storage medium.

The term image sensor as used herein should be broadly interpreted to include any image acquisition device including for example one or more of: camera, light sensor, IR sensor, ultrasonic sensor, proximity sensor, CMOS image sensor, shortwave infrared (SWIR) image sensor, or reflectivity sensor, "depth sensor", any other module that generate a video, indicating the distance of objects in the viewing space of the sensor. Sensor module may include but is not limited to time of flight sensor, IR grid projection, stereoscopic technology, and analysis of change in electromagnetic fields. A 2 dimensional (2D) image is an image obtained by an image sensor indicating data of the objects in the viewing space (FOV) of the sensor projected on a two dimensional plane. A 3 dimensional (3D) image is an image obtained by an image sensor indicating data of distances and locations of objects in the viewing space (FOV) of the sensor projected on a two dimensional plane.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter, fewer, more and/or different stages than those shown in FIGS. 3, 5, 7, 8, and 11 may be executed. In embodiments of the presently disclosed subject matter one or more stages illustrated in FIGS. 3, 5, 7, 8, and 11 may be executed in a different order and/or one or more groups of stages may be executed simultaneously. FIGS. 1 and 2 illustrate a general schematic of the system architecture in accordance with an embodiment of the presently disclosed subject matter. The modules/components in FIGS. 1 and 2 may be centralized in one location or be dispersed over more than one location. In other embodiments of the presently disclosed subject matter, the system may comprise fewer, more, and/or different modules/components than those shown in FIGS. 1 and 2.

It should be noted that the term "criterion" (or "condition") as used herein should be expansively construed to include any compound criterion (or conditions), including, for example, several criteria (or condition) and/or their logical combinations.

Bearing the above in mind attention is now drawn to FIG. 1 showing system 2 for touch free operation of a device having a display in accordance with the presently disclosed subject matter. System 2 comprises a device 4 having a display 6. The term "device" as used herein includes, but is not limited to, any one of: a personal computer (PC), an entertainment device, Set top Box, TV, and a mobile game machine, a mobile phone or tablet, e-reader, portable game console, a portable computer such as laptop or ultrabook, a personal computer (PC), All-in-One, TV, Set-Top Box, connected TV, display device, a home appliance, communication device, air-conditioner, a docking station, a game machine, a digital camera, a watch, interactive surface, 3D display, an entertainment device, speakers, a Smart Home, a kitchen appliance, a media player or media system, a location based device; and a mobile game machine, a pico projector or an embedded projector, a medical device, a medical display device, a vehicle, an in-car/in-air Infotainment system, navigation system, a wearable device, an augment reality enabled device, wearable goggles, a location based device, a robot, interactive digital signage, digital kiosk, vending machine, ATM.

The term "display" as used herein should be broadly interpreted to include any type of plane or surface on which images or other type of visual information is being displayed, including, but not limited to, any type of display (e.g. a CRT, Plasma, LCD, LED, OLED, 3D display, e-ink). The term "display" may be broadly intercepted to include a projector and a plane or surface on which it project any kind of images or visual information. It should be noted that where the present discussion refers to a "display" this should be considered as a mere example and should be broadly interpreted to include any type of display including a plane or surface, as described above. The terms "display" and "plane" are used herein interchangeably.

An image sensor system 8 is positioned adjacent to the device 4 and obtains images of a three-dimensional viewing space (otherwise known as field of view) indicated by the broken lines 10. A user 12 is situated in the viewing space and thus appears in images obtained by the image sensor system 8. The output of the image sensor system 8 can be for example a 2D (two dimensional) color or infrared (IR) video. Alternatively, the image sensor system 8 may be a depth video system comprising a 3D image sensor or two 2D stereoscopic image sensors. The image sensor system 8 may comprise a combination of some or all of the above mentioned image sensor types.

Images obtained by the image sensor system 8 are input to a processing unit 12 which may be integral with the image sensor system or connected to the image sensor system by a wired or wireless communication channel. The processing unit 12 is shown schematically in FIG. 2*b*. The processing unit 12 includes a processor 15 and a memory 13 which can be used for storing images obtained by the image sensor system 8. The processing unit 12 is configured to analyze images obtained by the image sensor system 8 and to track one or more predefined pointing elements, which are being used by the user for interacting with the display. Pointing element can be for example, a fingertip 14 of a user 16 situated in the viewing space of the image sensor system 8. In other cases the pointing element can be for example one or more hands of a user, a part of a hand, one or more fingers, one or more parts of a finger (one or more fingertips), or a hand held stylus. It is noted that in the following discussion the term "fingertip" is occasionally used as an example of a pointing element. This is done by way of non-limiting example only and should not be construed to limit the presently disclosed subject matter in any way.

According to the presently disclosed subject matter, processing unit 12 is further configured to determine a point or area on the display 6 towards which the fingertip 14 is pointing (otherwise referred to herein as "aimed point"). The processing unit 12 can be configured to indicate the icon on the display 6 towards which the fingertip 14 is pointing as determined by the processing unit.

Indication (feedback) of an icon being pointed at can be provided, for example as a visual indication, an audio indication, a tactile indication, an ultrasonic indication, or a haptic indication. A visual indication may be, for example, in a form such as an icon displayed on a display, a change in an icon on a display, a change in color of an icon on a display, an indication light, an indicator moving on a display, a directional vibration indication, or an air tactile indication. The indication may be provided by an indicator moving on a display. The indicator may appear on top of all other images or video appearing on the display. The user's eye 22, the fingertip 14 and the selected icon on the display 6 are collinear, lying on a common viewing ray 24.

It should be noted that the term "icon" as used herein is used as one non-limiting example of a graphical element which is displayed on the display and can be selected by a user. Such graphical elements can include for example, in addition to icons, 2D and 3D graphical elements, objects and/or part of an object shown within a displayed image and/or movie, text displayed on the display or within a displayed file, objects within an interactive game, a pixel or a collection of pixels and so forth.

Processing unit 12 is also configured to display on the display 6 one or more selectable graphical elements (e.g. icons) 20. Four icons 20*a*, 20*b*, 20*c*, and 20*d* are shown in FIG. 1. This is by way of example only, and any number of icons can be displayed on the display 6 at any time. Any one of the icons can be selected by the user 16 pointing with the pointing element 14 at the particular icon the user wishes to select.

The processing unit may be configured to identify a selection of an icon by the user based on a predefined criterion. For example, when the user points at the icon for a predefined period of time (e.g. a predefined number of seconds) processing unit determines a desire to select the icon. According to another example, the processing unit may be configured to identify a selection of an icon by the user when the user performs a predefined motion towards the selected icon. For example the motion can be a tapping motion, which consists of a movement of the pointing element 14 towards the selected icon followed by a movement of the fingertip 14 away from the selected icon. System 2 can be further configured to generate a visual and/or audio feedback when pointing to an icon and when selecting one.

As exemplified in FIG. 1, it is not necessary that the pointing element 14 contacts the display 6 while pointing or during the tapping motion. In the example illustrated with reference to FIG. 1, fingertip 14 is pointing towards the icon 20b. Selection of icon 20b is detected by the processing unit in images of a video stream obtained by the image sensor system 8. When the processing unit determines that a particular icon has been selected, a corresponding command and/or message associated with the selected icon is executed.

It should be noted that as used herein a command and/or message mentioned herein can be addressed to any type of destination including, but not limited to, one or more of: operating system, one or more services, one or more applications, one or more devices, one or more remote applications, one or more remote services, or one or more remote devices.

The presently disclosed subject matter may further comprise communicating with an external device or website responsive to selection of a graphical element. The communication may comprise sending a message to an application running on the external device, a service running on the external device, an operating system running on the external device, a process running on the external device, one or more applications running on a processor of the external device, a software program running in the background of the external device, or to one or more services running on the external device. The method may further comprise sending a message to an application running on the device, a service running on the device, an operating system running on the device, a process running on the device, one or more applications running on a processor of the device, a software program running in the background of the device, or to one or more services running on the device.

The presently disclosed subject matter may further comprise, responsive to a selection of a graphical element, sending a message requesting a data relating to a graphical element identified in an image from an application running on the external device, a service running on the external device, an operating system running on the external device, a process running on the external device, one or more applications running on a processor of the external device, a software program running in the background of the external device, or to one or more services running on the external device.

The presently disclosed subject matter may further comprise, responsive to a selection of a graphical element, sending a message requesting a data relating to a graphical element identified in an image from an application running on the device, a service running on the device, an operating system running on the device, a process running on the device, one or more applications running on a processor of the device, a software program running in the background of the device, or to one or more services running on the device.

The message to the external device or website may be a command. The command may be selected for example, from a command to run an application on the external device or website, a command to stop an application running on the external device or website, a command to activate a service running on the external device or website, a command to stop a service running on the external device or website, or a command to send data relating to a graphical element identified in an image.

The message to the device may be a command. The command may be selected for example, from a command to run an application on the device, a command to stop an application running on the device or website, a command to activate a service running on the device, a command to stop a service running on the device, or a command to send data relating to a graphical element identified in an image.

The presently disclosed subject matter may further comprise, responsive to a selection of a graphical element, receiving from the external device or website data relating to a graphical element identified in an image and presenting the received data to a user. The communication with the external device or website may be over a communication network.

Commands and/or messages executed by pointing with two hands can include for example selecting an area, zooming in or out of the selected area by moving the fingertips away from or towards each other, rotation of the selected area by a rotational movement of the fingertips. A command and/or message executed by pointing with two fingers can also include creating an interaction between two objects such as combining a music track with a video track or for a gaming interaction such as selecting an object by pointing with one finger, and setting the direction of its movement by pointing to a location on the display with another finger.

According to the presently disclosed subject matter commands and/or messages can be executed responsive to a predefined gesture which is being performed by the user during performing a pointing gesture before and/or after the aimed point is identified. System 2 can be configured to detect a given gesture and execute an associated command and/or message. Wherein gestures include, but are not limited to: a swiping motion, a pinching motion of two fingers, pointing, a left to right gesture, a right to left gesture, an upwards gesture, a downwards gesture, a pushing gesture, opening a clenched fist, opening a clenched first and moving towards the image sensor, a tapping gesture, a waving gesture, a clapping gesture, a reverse clapping gesture, closing a hand into a fist, a pinching gesture, a reverse pinching gesture, a gesture of splaying fingers on a hand, a reverse gesture of splaying fingers on a hand, pointing at an graphical element, holding an activating object for a predefined amount of time, clicking on an graphical element, double clicking on an graphical element, clicking from the right side on an graphical element, clicking from the left side on an graphical element, clicking from the bottom on an graphical element, clicking from the top on an graphical element, grasping a graphical element of the object, gesturing towards a graphical element of the object from the right, gesturing towards a graphical element from the left, passing through a graphical element from the left, pushing the object, clapping, waving over a graphical element, performing a blast gesture, performing a tapping gesture, performing a clockwise or counter clockwise gesture over a graphical element, grasping a graphical element with two fingers, performing a click-drag-release motion, and sliding an icon.

Figure 2B:
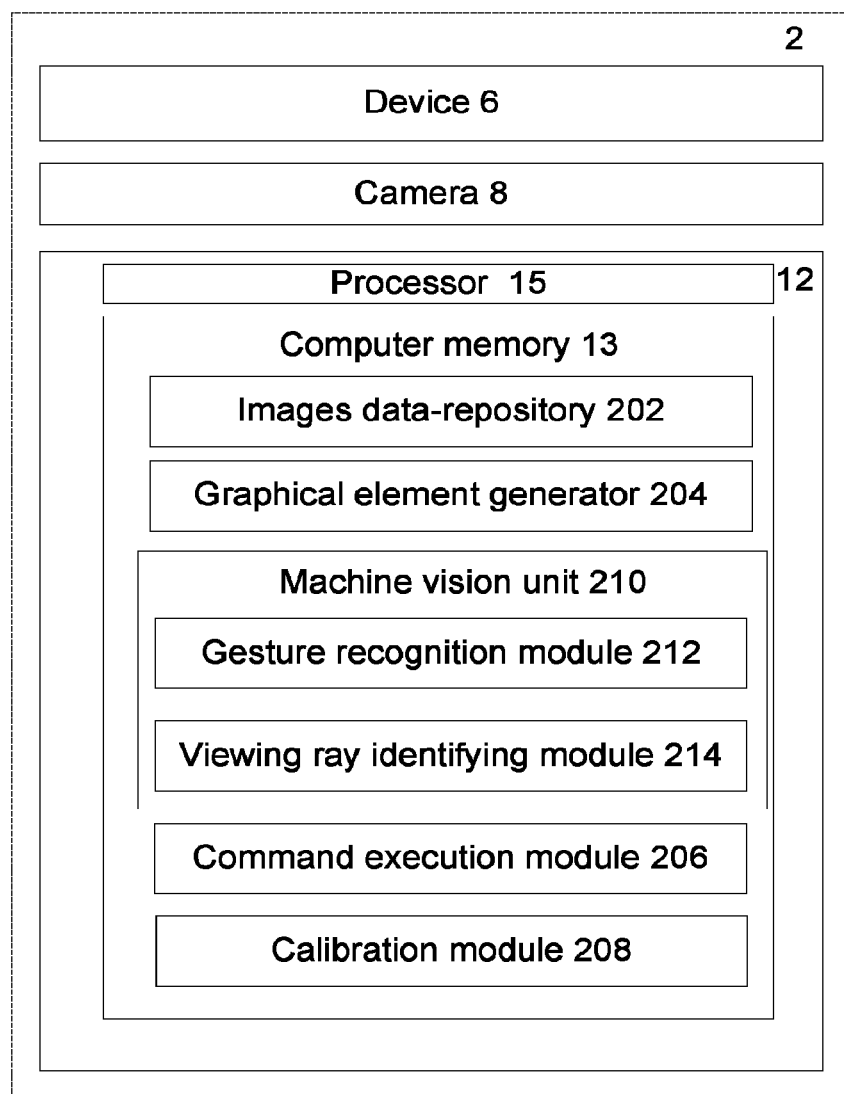
FIG. 2b shows a functional block diagram schematically illustrating an example of system 2 in accordance with the presently disclosed subject matter.

FIG. 2b is a functional block diagram illustrating an example of system 2, in accordance with the presently disclosed subject matter. As explained above, processing unit 12 is operatively connected to image sensor 8 and device 6 and comprises a processor 15 and computer memory 13.

According to the example illustrated with reference to FIG. 2b processing unit further comprises images date-repository 202 configured for storing images captured by the image sensor; Graphical element generator 204 configured to generate and display graphical elements on the display; command execution module 206 configured to enable execution of a command associated with a respective icon displayed on the display; calibration module 208 configured for performing a calibration process as described below; and machine vision unit 210. Machine vision unit can comprise for example gesture recognition module 212 configured to identify in the captured images gestures made by the user; and viewing ray determination module 214 configured to identify a point or an area (the aimed point) on the display towards which a user is pointing.

It is noted that the term "aimed point" should be broadly interpreted to include any point or area identified on the plane (e.g. display). The aimed point can be defined for example as coordinates of one or more points (e.g. pixels) on the plane as well as an area on the plane.

Operations performed by the different functional components of system 2 and more specifically of processing unit 12 are described in more detail below with reference to FIGS. 3-12. Operations described with reference to FIGS. 3-12 are applicable in a system equipped with one or more image sensors generating at least one of 2D images and 3D images.

Figure 3:
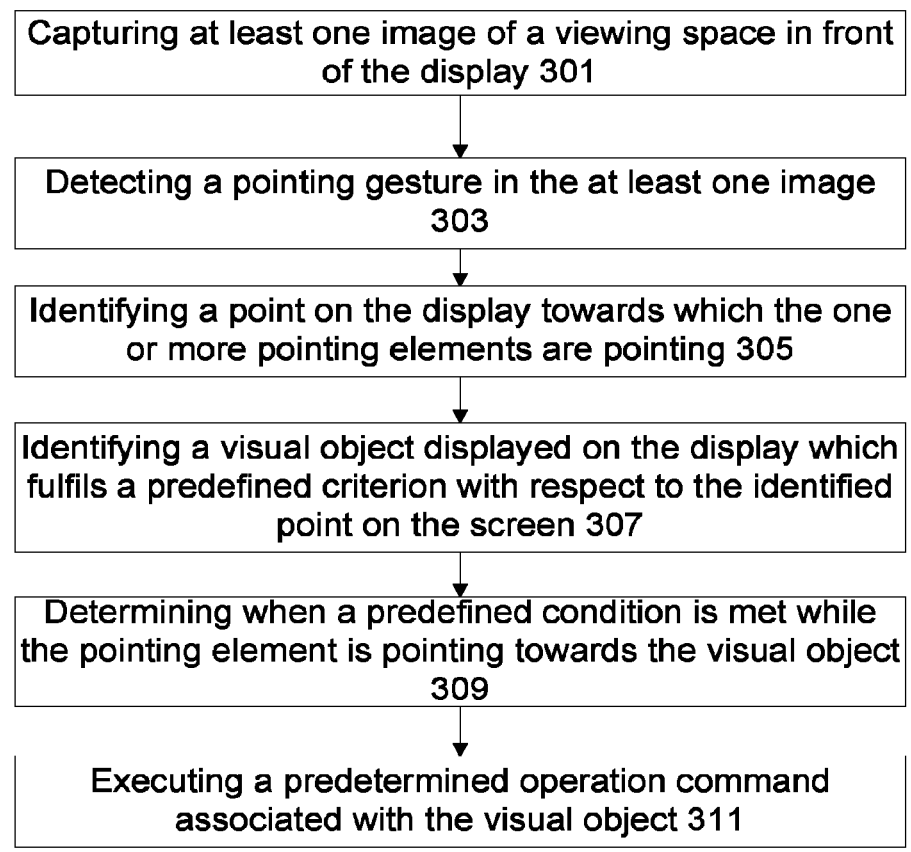
FIG. 3 is flowchart showing an example of operations carried out in accordance with the presently disclosed subject matter.

FIG. 3 is a flowchart showing an example of operations which are carried out in accordance with the presently disclosed subject matter. The operations described with reference to FIG. 3 can be performed for example by system 2 described above.

At block 301 a image sensor situated adjacent to a display (6) captures images of the viewing space in front of the display. Images can be captured and stored in a data-repository (e.g. image data-repository 202) to be processed at a later stage. Alternatively, each image which is captured can be processed immediately after it has been captured without storing the image itself. The captured images can include for example, a user positioned in front of the image sensor and attempting to interact with one or more graphical elements displayed on a plane (e.g. by attempting to point towards an icon or text displayed on the display).

One or more predefined body parts of the user (for example parts of the user's face such as the user's eyes) and one or more pointing elements are identified in the captured images (block 303). Once identified, data indicative of the location of the one or more predefined body parts and data indicative of the location of the one or more pointing elements is obtained. Identification of the user's body part and the pointing elements and obtaining of the respective location data can be accomplished for example, with the help of machine vision unit 210 (for example with the help of gesture recognition module 212).

A point on the display towards which the user is pointing (i.e. the aimed point) is identified (block 305). The aimed point can be identified for example with the help of viewing ray identification module 214. As mentioned above, the user's eye 22, the pointing element and the aimed point are collinear, lying on a common viewing ray 24. Thus, according to the presently disclosed subject matter processing unit 12 is configured to identify a viewing ray extending from a predefined body part of the user (e.g. the user's eye) through the pointing element and intersecting the display at a certain point i.e. the aimed point.

It is noted that the user's eye (or eyes) is one non-limiting example of a facial part of the user which can be used for identifying a viewing ray as disclosed herein and other facial parts (such as nose, ears, lips etc.) and body parts can be similarly identified and used for that purpose. It should be further noted that wherever the eye of the user is mentioned in the present description it should be considered as an example only and be broadly interpreted to include other parts of the face or body as well.

A graphical element displayed on the display which fulfills some predefined criterion with respect to the identified location of the aimed point on the display (e.g. graphical element located closest to the identified aimed point on the display) is determined as a graphical element selected by the user (block 307).

As described below according to the presently disclosed subject matter operations associated with block 305 can further include one or more processes designated for enhancing the identification of the point on the display towards which the user is pointing.

Once a selected graphical element is determined, it is further determined whether a predefined condition is met while the pointing element is pointing towards the selected graphical element (block 309). As mentioned above, the condition can be for example, a predefined period of time during which the pointing element is pointing towards the determined point and/or a predefined gesture (e.g. a tapping motion towards the display), or any other suitable condition. As further mentioned above, once the predefined condition is met a command and/or message associated with the selected graphical element is executed (block 311). According to one example, command execution module 206 can be configured to execute a command (e.g. by interacting with other functional elements in device 6 or in some other device) which is associated with the selected graphical element.

In view of the foregoing, it is understood that in order to determine which graphical element is selected by an interacting user it is required first to identify a location of a point on the display towards which the user is pointing. To this end, system 2 can be configured to obtain from one or more captured images, data indicative of the location of one or more predefined body parts (e.g. user's eye) and one or more pointing elements within the viewing space, as viewed by the image sensor. A viewing ray which correlates with the data indicative of the location of the one or more predefined body parts and the location of the one or more pointing elements can then be determined. For example the viewing ray can be extended through a first point representing the location of the one or more body parts and a second point representing the location of the one or more pointing elements. The aimed point can be determined at the intersection of the viewing ray with the plane.

In case system 2 comprises a 3D image sensor or a of pair 2D stereoscopic image sensors, processing unit 12 can be configured to locate the (X,Y,Z) location of the user's eye 22 and/or the user's fingertip 14 in the 3D viewing space. The processing unit then determines a viewing ray 24 having a vertex at the eye 22 and passing through the fingertip 14. As illustrated in FIG. 1, dot 18 is then positioned on the display 6 where the viewing ray intersects the display.

In some cases system 2 can comprise a combination of 2D image sensor (generating 2D image information) and 3D image sensor (generating 3D image information) and be configured to obtain from images captured by the 2D image sensor information regarding the X,Y coordinates of the user's eye 22 and the user's fingertip 14 and obtain from images captures by the 3D image sensor, information regarding the z coordinate of the user's eye 22 and the user's fingertip 14. The combined information from the 2D and 3D image sensors can be used for determining the 3 dimensional viewing ray. For example, the 3D image sensor can be characterized by a resolution which is lower than the resolution of the 2D image sensor (e.g. the resolution of the depth sensor is less than a quarter of the resolution of the 2D image sensor).

A greater challenge is tackled when using a 2D image sensor. A user standing in front of a display can point anywhere on the display and the specific viewing ray by which the user is pointing can be determined based on the 2D position (e.g. X,Y coordinates) of the eyes of the user and the 2D position of the pointing element as captured by the image sensor along with the distance of the user or user's eyes from the display and the distance of the pointing element (e.g. the user's fingertip) from the display or the user's body.

According to the presently disclosed subject matter processing unit 12 can be configured to determine a point on the display towards which the user is pointing (aimed point) as follows. The X,Y coordinates of the user's eyes (or some other one or more predefined body parts) can be identified in images captured by the image sensor and the distance of the user from the display (R1) can be estimated. Based on the estimated distance R1 the z coordinate of the user's eyes in the viewing space can be obtained.

R1 can be determined for example, based on the distance between the user's eyes as identified in an image obtained by the image sensor. Similarity exists between the distances between the eyes (e.g. pupils) of different individuals. Higher similarity may be found between individuals of the same ethnic group. Therefore the distance between the eyes of a user can be indicative of the distance of the eyes from the display.

In addition, the X,Y coordinates of the pointing element can be identified in images captured by the image sensor. Using the estimated distance of the pointing element from the user's body (in the direction of the display referred below as R2), the z coordinate of the pointing element in the viewing space can be obtained. Methods of estimating the distance of the pointing element from the user's body are discussed below.

Once the X,Y,Z coordinates of the user's eyes and the X,Y,Z coordinates of the pointing element are obtained, a straight line (viewing ray) extending through these two points is determined and the point where this line intersects the display is identified. The identified point of intersection of the line with the display is determined as the point on the display towards which the user is pointing (the aimed point).

In case the display is 3D display the displayed graphical elements can be 3D graphical elements and can be perceived to the user as being located in the viewing space located in front of the display or behind the display. Thus, determination of an aimed point can be performed by determining a viewing ray extending from the user's eyes, through the pointing element and through the first graphical element (e.g. a 3D graphical element) intersecting the viewing ray.

Figure 4:
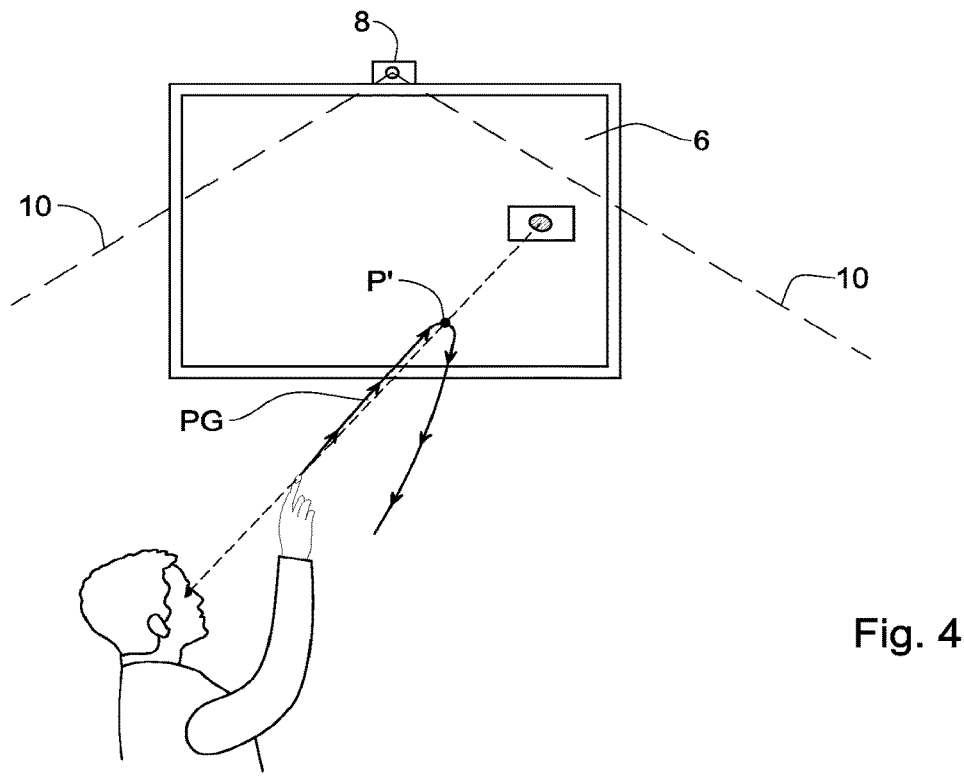
FIG. 4 is a schematic illustration demonstrating a point P' while a user is pointing towards the screen, in accordance with the presently disclosed subject matter.

As described above, in order to determine the point on the display towards which a user is pointing, it is required to identify the location of the pointing element in the viewing space while pointing. Therefore it is required to identify the location of the pointing element during a pointing gesture where the pointing element is assumed to be pointing towards a selected point on the display. The pointing element location (referred herein as point P'), which could be for example the point where the pointing element is located closest to the display point P'. FIG. 4 is a schematic illustration demonstrating point P' during a pointing gesture, in accordance with the presently disclosed subject matter.

As used herein the term "pointing gesture" refers to a gestured of a pointing element, aimed to point to a desired area or point on a display. For example, a pointing gesture may be a gesture performed by a user in which his fingertip is moved in space in front of a display towards a certain graphical element displayed on the display. During the pointing gesture in at least a portion of the motion of the pointing gesture the pointing element is extended towards a desired point on the display. In FIG. 4 the motion path of the pointing element during a pointing gestures is indicated as line PG comprising point P' located closets to the display.

According to the presently disclosed subject matter system 2 can be configured to identify, during a pointing gesture, point P' where the pointing element is located closest to the display.

If a depth image sensor or a stereoscopic image sensors are used, processing unit 12 can be configured to extract point P' from a captured frame where the Z coordinate of point P' is determined where the pointing element is located closest to the display. For example, if the image sensor is located on the same plane as the display, the coordinate of the P' is where the Z coordinate is the smallest.

When using a single 2D image sensor, point P' can be identified based on the analysis of one or more features of the pointing element during the pointing gesture including for example: a collection of all or part of position data components of the pointing element during the pointing gestures, the motion path of the pointing element during the pointing gesture, the motion vectors of the pointing element, the change in motion vectors of the pointing element, relation between different motion vectors, the pose (or the change in the pose) of the pointing element in space during the pointing gesture, the size of the pointing element, and acceleration and deceleration of the pointing element during the pointing gesture.

After point P' is reached, the user retracts his arm. Changes in the position of the pointing element in the viewing space (e.g. as indicated by coordinates), which indicate that the arm has been retracted, can be identified and used to identify the location of point P'.

According to another example the location of point P' can be identified based on changes in the size of the pointing element during the pointing gesture. As the user extends his arm closer towards the display, the size of the pointing element increases (e.g. the size of the user's fingertip in the captured images is increased). Processing unit 12 can be configured to track the size of the pointing element and determine the location of the pointing element where the size of the pointing element (or more specifically the tip of the pointing element) is the largest.

Figure 5:
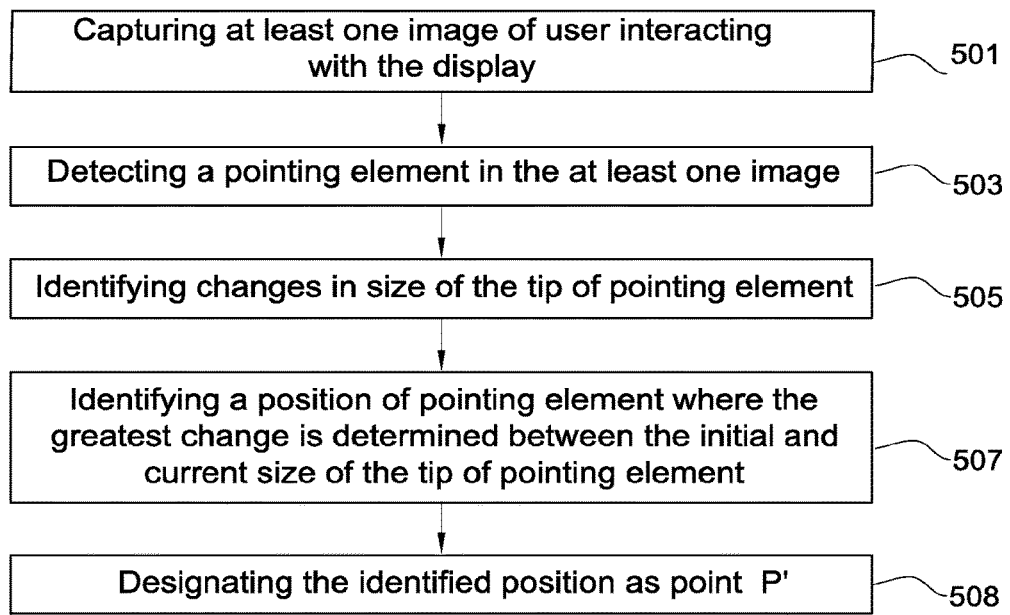
FIG. 5 is a flowchart illustrating an example of operations for determining point P' carried out in accordance with the presently disclosed subject matter.

FIG. 5 is a flowchart illustrating an example of operations performed for identifying point P', in accordance with the presently disclosed subject matter. Operations described with reference to FIG. 5 can be executed for example, by processing unit 12 described above (e.g. with the help of machine vision module 210).

The image sensor captures images of the user while attempting to interact with graphical elements displayed on the display (block 501). A pointing element is identified in the captured images (block 503). The captured images are processed and changes in the size of the pointing element in different images are identified (block 505).

For example, the ratio between the size of the fingertip at the initial position, at the start of the pointing gesture, and the size of the fingertip along different positions along the motion of the arm towards the display can be calculated and the percentage of growth in size of the fingertip can be identified. Once the pointing element is at the shortest distance from the display the greatest change in its size is identified. When the arm is then retracted the change in size is reversed as the size of the tip becomes smaller.

A position of the pointing element where the greatest change is identified between the initial and current size of the tip of pointing object is identified (block 507). This position is designated as point P' (block 508).

As mentioned above the distance of the user's eyes from the display (R1) and the distance of the pointing element from the user's body are estimated in order to identify a point on the display towards which the user is pointing.

Figure 6A:
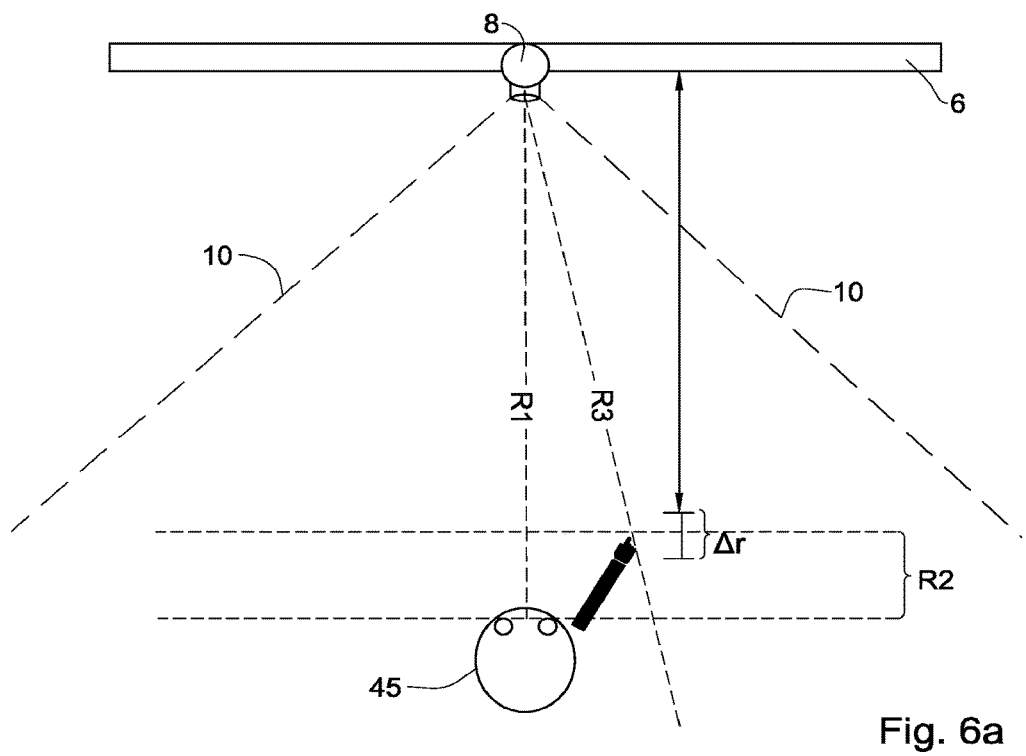
FIG. 6a is a schematic illustration showing a top view of a user pointing towards a display, in accordance with the presently disclosed subject matter.

FIG. 6a is a schematic illustration showing a top view of a user pointing towards a display, in accordance with the presently disclosed subject matter. FIG. 6a shows image sensor 8 positioned adjacent to display 6 capable of capturing images of a three-dimensional viewing space indicated by the broken lines 10. The distance of the user from the display is indicated by line R1 extending from the display to a point on an imaginary line between the eyes (e.g. between the pupils) of the user. As mentioned above distance R1 can be determined for example, based on the distance between the user's eyes as identified in an image obtained by the image sensor.

Furthermore, based on typical human behavior it can be assumed that when a user is pointing towards the display his arm is not fully extended from his body, and neither is it fully retracted towards the body. The length of the extension of the pointing element from a predefined body part of the user (e.g. the user's eye) towards the display is indicated in FIG. 6a by range R2.

R2 can be estimated, for example, based on the user's height and the estimated proportions of his body and possibly also on information indicating the distance of the user from display (R1). Additionally, information with respect to the age and gender of the user can be also used during the estimation of R2.

In addition, R2 can be optionally estimated based on recorded statistical information which is obtained from a plurality of users and indicates the length of the extension of the arm towards the display of the users while pointing (e.g. taking into consideration the height and proportions of each user). Optionally this information can be classified based on geographical and/or ethnic origin of the users, in order to discriminate between different pointing gestures which may be typical to different geographical and/or ethnic origins. Thus, for example, an average length of R2 can be calculated based on the recorded information with respect to the extension of the arm of many users.

While R2 can enable to estimate the distance of the pointing element from the user's body, some deviation may still exist between the extensions of the arm in the pointing gestures made by different users. FIG. 6a further illustrates Δr which is another range representing the possible deviation in the extension of the arm between different pointing gestures. Assuming that, as mentioned above, R2 is an average value of the measured extension of the arm in pointing gestures of different users, Δr can be determined, for example, as a value which equals to one or more standard deviations of that average value described above (e.g. after normalization of the height factor).

Figure 6B:
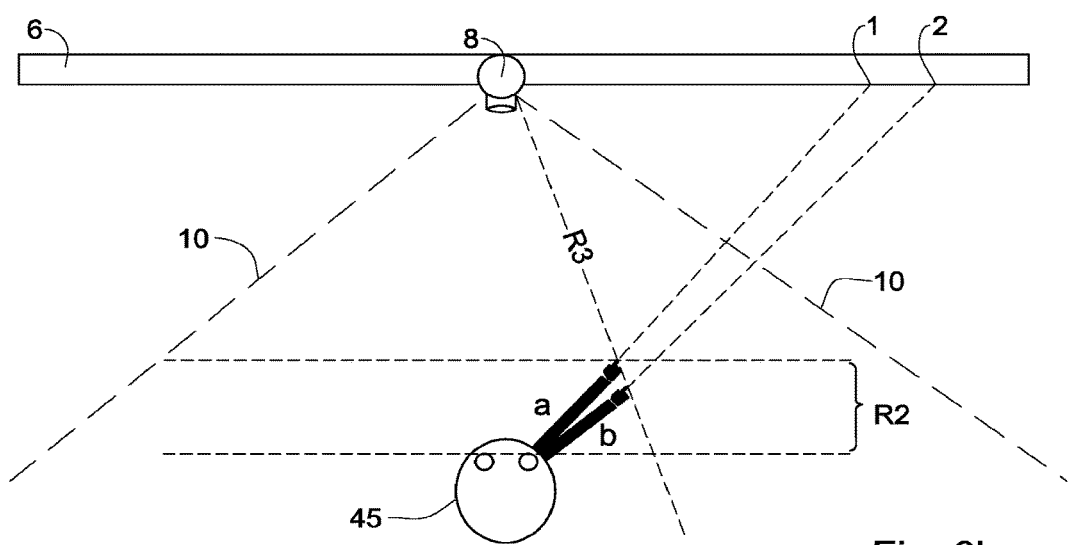
FIG. 6b is a schematic illustration showing different extensions of a pointing element generating a similar projection, in accordance with the presently disclosed subject matter.

Unlike a 3D image sensor, the images which are captured by a 2D image sensor provide a projecting of the image of the user onto the display without real depth perception. FIG. 6b is a schematic illustration showing different extensions of a pointing element generating a similar projection in accordance with the presently disclosed subject matter. FIG. 6b shows image sensor 8 positioned adjacent to display 6 capable of capturing images of a three-dimensional viewing space. Images of user 45 are captured by image sensor 8. User 45 is extending his arm and pointing at display 6. Two extensions of different lengths are shown. The viewing ray extending from extension 'a' (the longer extension) intersects display 6 at point 1 while the viewing ray extending from extension 'b' (the shorter extension) intersects display 6 at point 2. As illustrated in FIG. 6b, although extensions 'a' and 'b' are pointing to different points on the display they are both viewed by image sensor 8 in the same manner-converging on the same line R3.

As mentioned above, in order to identify a point on the display towards which a user is pointing, a viewing ray connecting the eyes of the user, the pointing element and a respective point of intersection of the viewing ray with the display, is determined. However, as a result of various uncertainties which exist during the identification of the viewing ray, uncertainly also exists as to where exactly on the display the user is pointing.

The uncertainties include for example, uncertainty with regard to the identification of the tip of the pointing object, and identification of a point located between the eyes, which best represents the viewing ray. Furthermore, as explained above, in case 2D image sensor is used, an additional uncertainty results from the ambiguity with respect to the actual extension of the pointing element from the body of the user and with respect to the distance of the user from the display.

As a result of these uncertainties, when a user is pointing towards the display, instead of identifying a single point on the display towards which the user is pointing, a larger plane can be identified on the display (referred to herein as a "candidate plane"). The candidate plane represents a plane on which a plurality of possible lines extending from the eyes of the user through the pointing element intersect the display. An image obtained by image sensor 8 will include the user's eye and the fingertip 14, and will thus include a projection of the viewing ray onto the projection plane (the projection plane being the plane captured by the image sensor). The set of all lines in the viewing space whose projection onto the projection plane is the same as the projection of the viewing ray onto the projection plane form a plane, referred to herein as the "candidate plane". Each line extending from the user's eye through a pointing element and a common candidate plane is referred to herein as a "candidate viewing ray". A candidate plane can be characterized by different features including for example, the number of pixels in a candidate plane (a candidate plane can comprise one or more pixels), its size (e.g. in pixels or its measured diameter), its shape, its location on the screen, etc.

Accordingly, it would be advantageous to more accurately identify a point or area on the display towards which a user is pointing, notwithstanding the uncertainties mentioned above.

One possible solution to this problem, which is provided herein, is based on a calibration process. In the calibration process, the user is instructed to point sequentially at each of one or more graphical elements (e.g. icons) displayed on the display. One of the graphical elements can be for example a graphical element whose selection is required to switch the device from standby mode to active mode or unlock the display. When a user points towards such a graphical element, the processing unit 12 determines the position of the pointing element and the user's eyes in an image obtained by the image sensor system while the user is pointing at the graphical element. The user's fingertip may be identified in an image obtained by the image sensor, for example, as disclosed in Applicant's co-pending U.S. patent application Ser. No. 10/593,628 having publication number 2008-0042981. Methods for identifying a face and eyes in an image are well known in the art. When the user subsequently points to an icon on the display, the processing unit 12 determines the point on the display, and hence the icon, to which the user is pointing using the calibration data, together with limitations on the distance between the user's eye 22 and fingertip 14 and the distance of the user from the display 6 which may be determined from the distance between the user's eyes in the image obtained by the image sensor.

Figure 7:
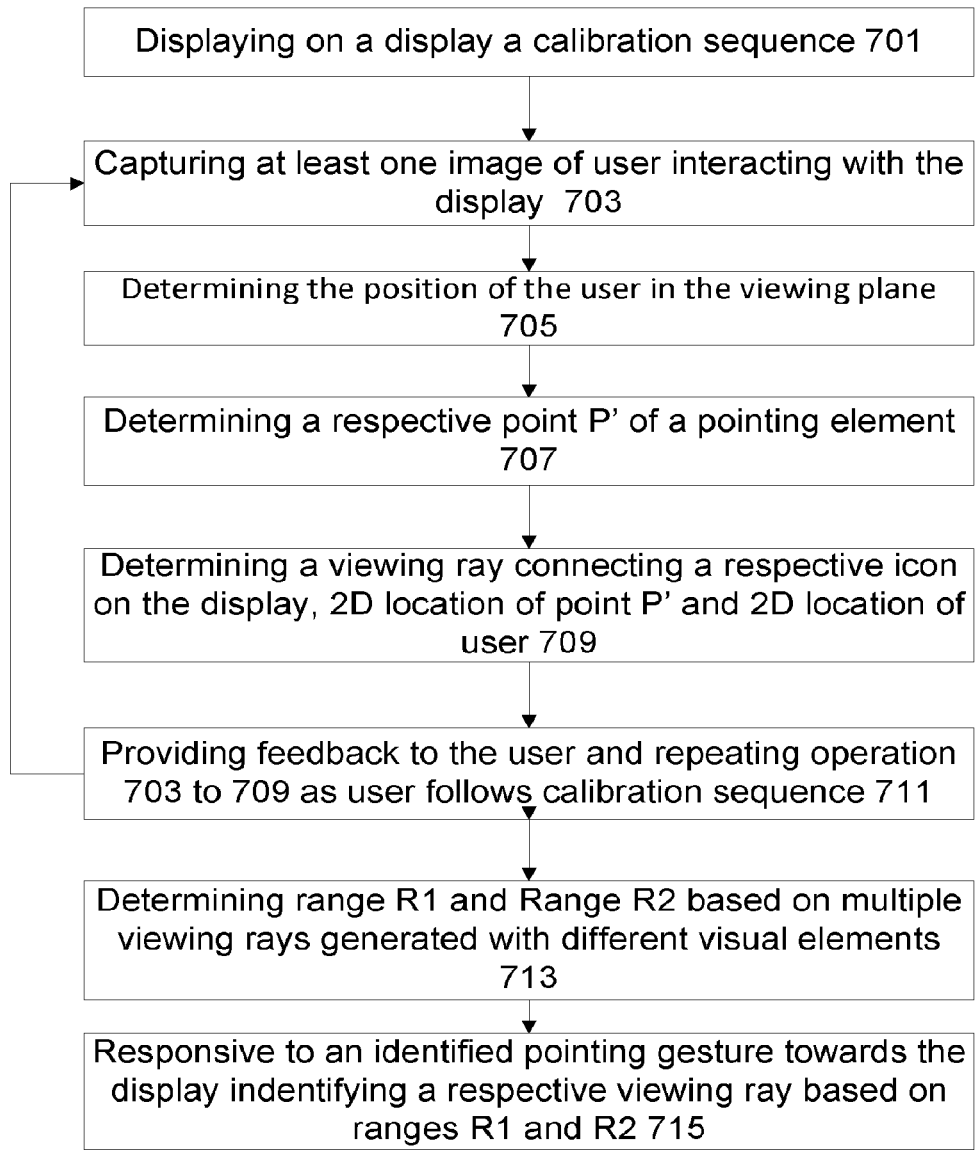
FIG. 7 is a flowchart illustrating an example of operations carried out during a calibration process, in accordance with the presently disclosed subject matter.

FIG. 7 is a flowchart illustrating operations performed during a calibration process, in accordance with the presently disclosed subject matter. Operations described with reference to FIG. 7 can be executed by processing unit 12 described above (e.g. with the help of calibration module 208).

During the calibration process the location of one or more predefined body parts of the user (e.g. the user's eyes), the location of the pointing element within the viewing space, and the distance of the pointing element from the user body when reaching point P' are more accurately estimated. At block 701 one or more graphical elements (e.g. icons) are displayed on the display. The graphical elements are displayed on the display in a predefined location, order or shape and provide a calibration sequence. The calibration sequence is characterized by the location of graphical elements on the display and the time and/or sequence of interaction with the different graphical elements. The user is required to interact (e.g. point to or swipe) with the graphical elements according to a predefined order. Alternatively or additionally, a calibration sequence can include a graphical element that should be swiped or moved according to a predefined pattern or shape.

More accurate estimation of the location of one or more predefined body parts of the user (e.g. the user's eyes) and the location of the pointing element within the viewing space is performed by using the information of the known location toward which the user is pointing, e.g. a graphical element which is displayed in a predefined location.

In some cases the user may be unaware of the calibration process. For example, as mentioned above, the calibration process can be presented to the user as an interaction required for unlocking the display (e.g. swiping a graphical element displayed on the display from left to right).

The user interacts with the display as required by the calibration sequence and the image sensor captures images of the user while doing so (block 703). The 2D location (e.g. in X,Y coordinates) of the user (e.g. the user's eyes) in the image obtained by the image sensor is determined (block 705). A pointing gesture is identified and a Point P' is determined e.g. using the location of the pointing element (e.g. in X,Y coordinates) where the pointing element is located closest to the display (block 707).

Since the calibration process is executed in accordance with a predefined calibration sequence, information indicating on which of the graphical elements displayed on the display, the user is currently supposed to be pointing, is available to processing unit 12. Therefore, the processing unit can more easily correlate between a viewing ray connecting the location of the user, point P' and a respective graphical element on the display, towards which the user is pointing. Accordingly, a respective viewing ray is extended from the relevant graphical element on the display, through the pointing element located at the respective point P' and on to the respective location of the user's body part (e.g. user's eyes) (block 709).

Feedback can be provided to the user (e.g. by changing one or more of the color, size, shape and position of the respective graphical element or by an audible indication). As the user follows the calibration sequence and interacts with the respective graphical elements on the display, the operations described with reference to blocks 703 to 709 may be repeated (block 711).

Figure 8:
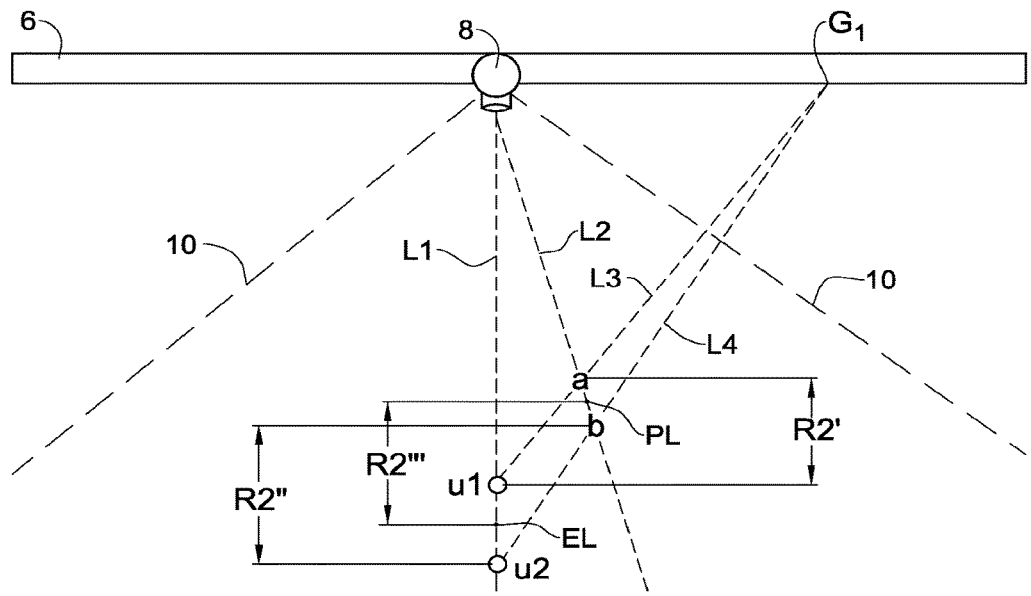
FIG. 8 is a schematic illustration demonstrating an example of a calibration process carried out in accordance with the presently disclosed subject matter.

FIG. 8 is a schematic illustration demonstrating one example of the calibration process. FIG. 8 shows image sensor 8 positioned adjacent to display 6 capable of capturing images of a three-dimensional viewing space indicated by the broken lines 10. A user is pointing towards icon $G_1$, which is displayed on the display as part of a calibration sequence (not shown). The user's eyes are in the 3D space in front of the image sensor, located along line L1. The pointing element location at point P' in the 3D space in front of the image sensor is located along line L2.

The distance of the user from the display (R1) can be estimated as described above; however, the calibration process enables to improve this estimation. Similarly the range R2 can be estimated as mentioned above; however, the calibration process enables to improve this estimation.

As described above with reference to FIG. 6a uncertainty exists with regard to the estimated range R2 (indicated above by $\Delta r$). According to one example, during the calibration process a first straight line (L3) is extended from icon $G_1$ on the display such that by crossing line L2 and line L1 the distance R2' is equal to R2−$\Delta r$ and a second straight line (L4) is extended from icon $G_1$ on the display such that by crossing line L2 and line L1 the distance R2" equals R2+$\Delta r$.

A point $EL_i$ on line L1 representing the estimated location of the user can be determined as any point located between u1 and u2. For example, it can be the point located exactly at the middle between the two points. A respective point $PL_i$ on line L2 can be determined by extending a straight line from point EL to icon $G_1$. R2 can be estimated as distance R2'". For any icon $G_i$ a respective point $EL_i$ representing the location of the user's eyes; and a point $PL_i$ representing the location of the pointing element can be determined as described above.

Reverting to FIG. 7, at block 713 the calibration estimation of range R1 and range R2 is determined. The calibration estimation of range R1 can be determined using on all the collected points EL obtained with respect to the different icons in the calibration sequence (e.g. a point located at the center of all identified points). The calibration estimation of range R2 can be determined using on all the collected distances R'" obtained with respect to the different icons in the calibration sequence, each related to a respective $EL_i$.

Once the system is calibrated, during regular operation, in response to a pointing gesture of the user towards the display, the point on the display towards which the user is pointing can be determined using the values of R1 and R2 as estimated in the calibration process (block 715).

According to the presently disclosed subject matter, processing unit 12 can be configured to determine a different range R2 for each icon on the display and create a calibration map associating the different icons and their respective location on the display with a corresponding range R2. Any other point on the display (not populated by a calibration icon), can be associated with respective range R2 based on the calibration map. This association can be based for example, on a linear combination of the location of icons and their respective range R2.

During regular operation, processing unit 12 can be configured, responsive to a pointing gesture of a user towards the display, to identify the general direction of the pointing gesture, and select a specific range R2 which is associated to a calibration icon located at a point on the display which is closest to the identified general direction.

In addition to or instead of the calibration process described above, the presently disclosed subject matter provides other techniques which enable to improve accuracy of identification of a point or area on the display towards which the user is pointing. As explained above, due to different uncertainties related to parameters used when determining a point on the display towards which the user is pointing, a candidate plane is identified on the display which represents a plane on which a plurality of possible lines extending from the eyes of the user through the pointing element intersect with the display.

The presently disclosed subject includes a technique for reducing the size of the candidate plane, and more accurately identifying the point on the display towards which the user is pointing.

In general, a first type of features and a second type of features can be obtained from captured images of a user interacting with the plane. The first type of features includes features with respect to the motion path of the pointing element during a pointing gesture made by a user. The first type of features include for example, a collection of all or part of the position data components of the pointing element during the pointing gestures, the motion path of the pointing element during the pointing gesture, the motion vectors of the pointing element, the change in motion vectors of the pointing element, relation between different motion vectors, the pose (or the change in the pose) of the pointing element in space during the pointing gesture, the size of the pointing element, and acceleration and deceleration of the pointing element during the pointing gesture.

The second type of features includes features with respect to the one or more candidate planes identified on the plane. The second type of features includes for example, size of the candidate planes, location of candidate planes on the plane, shape of the candidate plane, overlap between different candidate planes.

The processing unit can be configured to determine the aimed point on the plane using at least one of the first type of features, and the second type of features.

Figure 9:
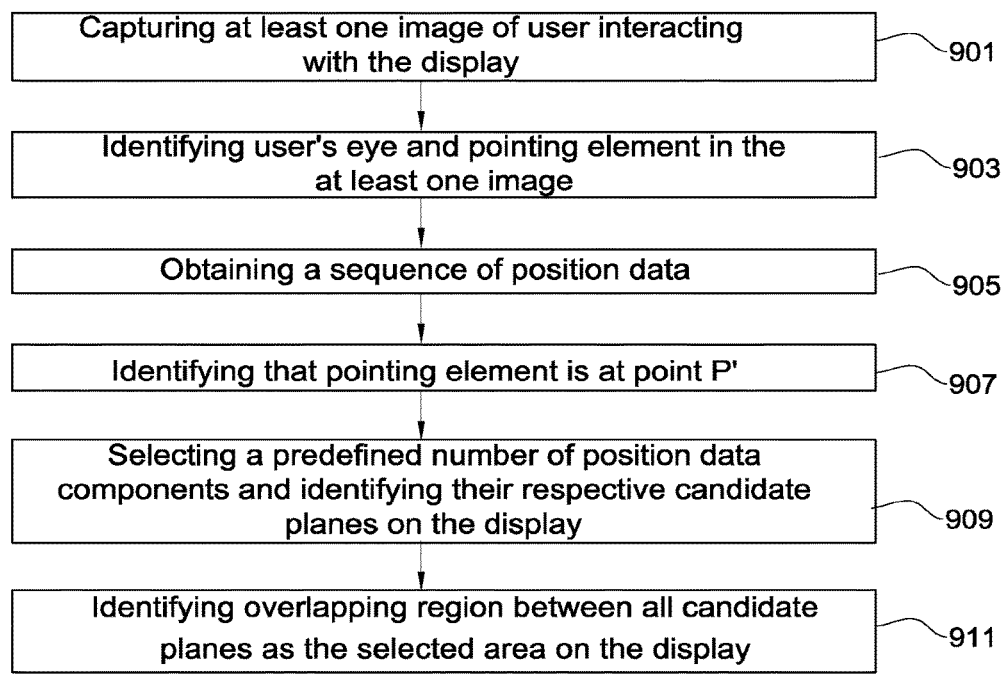
FIG. 9 is a flowchart illustrating an example of operations carried out in accordance with the presently disclosed subject matter.

FIG. 9 is a flowchart illustrating an example of operations performed for reducing the size of the candidate plane, in accordance with the presently disclosed subject matter. Operations described with reference to FIG. 9 can be executed for example, using processing unit 12 described above (e.g. with the help of machine vision unit 210).

At block 901, the image sensor captures images of the user while attempting to interact with graphical elements displayed on the display. The captured images are processed and the user's eyes and a pointing element are identified in the captured images (block 903). The motion path of the pointing element while it is being extended towards the display is traced and a sequence of position data components comprising different positions of the pointing element (e.g. user's fingertip) in the motion path is obtained (block 905).

The position data components are features, which are related to the first type of features mentioned above. More specifically, the position data components are features that describe the position of a pointing element in a given frame. For example, position data components can include X,Y coordinates of the tip of the pointing element in the viewing plane captured by the image sensor. According to this example, while the user's arm is extended closer towards the display, the two dimensional position of his fingertip with respect to the viewing plane (indicated by X,Y coordinates) at different points 30 during the motion, can be obtained and stored. Each stored position point (e.g. x,y coordinates) being a respective position data component.

According to the presently disclosed subject matter, the motion of the fingertip is traced until it is identified that the fingertip is located at point P' (block 907). At this point two or more position data components are selected from the sequence of position data components extracted from the motion path of the pointing element towards the display. The selected position data components can be for example, the position data components which correlate with the N frames before the pointing element reached point P' (the closest point to the display). Alternatively, the selected position data components can be positions located on similar viewing rays. A pair of similar viewing rays can be defined as viewing rays characterized by a distance which is smaller than a predefined value at the portion of the viewing ray located between the user's eyes and the display.

As explained above, each position data component in the collection of selected position components (represented for example, by X,Y, coordinates on the viewing plane) is associated with a respective viewing ray connecting, the user's eye through the pointing element located at a position indicated by the respective position data component, and intersecting the display. Due to the uncertainties discussed above, each of the viewing rays can be associated with a respective candidate plane on the display and not with one accurate point.

The respective candidate planes associated with the selected position data components are identified on the display (block 909). At block 911 an overlapping region between the candidate planes is identified and is designated as a selected viewing plane representing the aimed point (note that the relative location of the different candidate planes and their respective surfaces are features related to the second type of features mentioned above). Thus, the size of the candidate plane is reduced and a smaller area on the display is identified as the aimed point.

Figure 10:
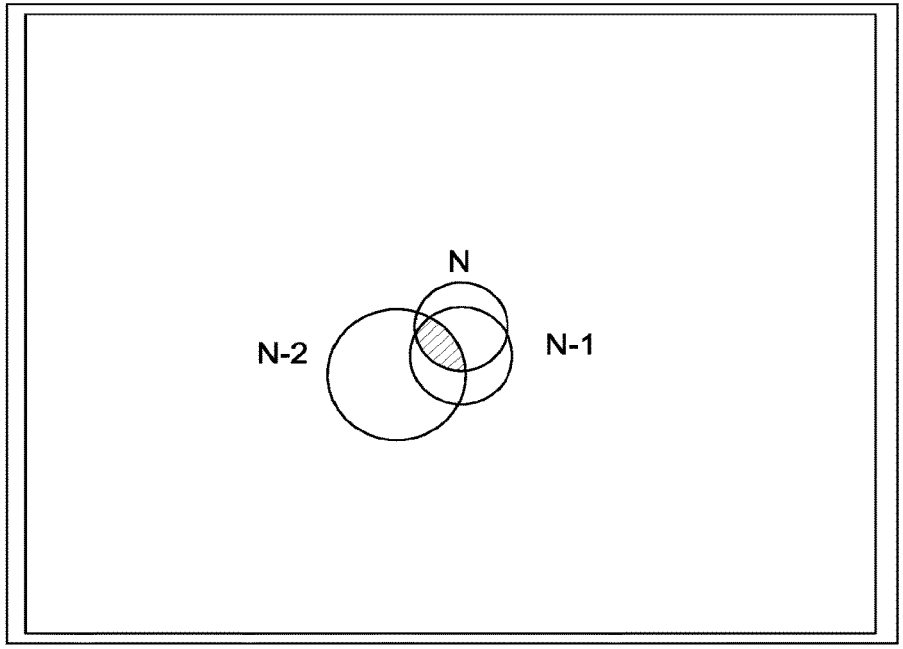
FIG. 10 is a schematic illustration showing three partially overlapping candidate planes, in accordance with the presently disclosed subject matter.

FIG. 10 is a schematic illustration showing three partially overlapping candidate planes, in accordance with the presently disclosed subject matter. Each candidate plane is illustrated as a circle covering a certain area on the display. For example, each plane is associated with a different position data component of the three last position data components from the collection of selected position values as described above (position values: n, n−1 and n−2). As illustrated in FIG. 10 the three candidate planes all point to the adjacent areas and share an overlapping portion (area filled with short lines) which is designated as the selected projection plane. An aim point may be determined as the center of the selected projection plane.

Figure 11:
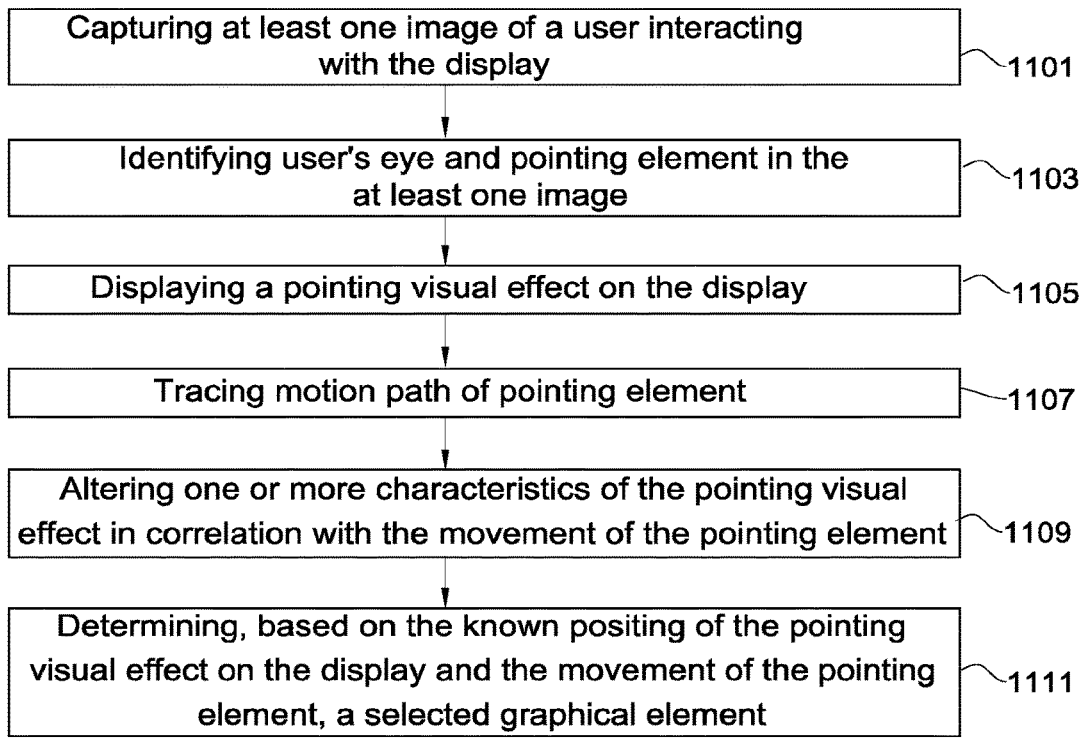
FIG. 11 is another flowchart illustrating an example of operations carried out in accordance with the presently disclosed subject matter.

The presently disclosed subject matter further discloses another technique which enables to more accurately identify the point on the display towards which the user is pointing. FIG. 11 is a flowchart illustrating operations carried out, in accordance with the presently disclosed subject matter. Operations described with reference to FIG. 11 can be executed by system 2, inter alia, with the help of processing unit 12 described above.

According to the subject matter disclosed herein, system 2 can be configured to provide feedback to a user pointing towards the display. This feedback assists the user to direct the pointing element towards a desired point on the display and therefore enables the user to more easily select a desired graphical element. As mentioned above the following operations are provided in the context of a 2D display, however similar operations, mutatis mutandis, can be executed with a 3D display.

As before, the image sensor captures images of the user while attempting to interact with graphical elements displayed on the display (block 1101). The user's eyes and pointing elements are identified in the captured images obtained by the image sensor (block 1103). Responsive to the detection of a pointing gesture, a pointing visual effect is displayed on the display (block 1105).

The pointing visual effect can be any kind of static or animated graphical element including for example: a smudge of color characterized by any shape or color, can be transparent or opaque, can be presented partially or fully, can be on top of one or more graphical element displayed on the display and/or behind of the same or other one or more graphical elements displayed on the display.

For example, the pointing visual effect can have a round symmetrical shape and a transparent color through which the graphical elements are discernible and can appear to the user as a flashlight beam illuminating a portion of the display. The characteristic of pointing visual effect (such as, location, size, colors, shape, brightness, transparency level) may be changed during the time it is being displayed on the display.

In the case of 3D display, the pointing visual effect can be for example an animation of an illuminating circle that starts at a certain distance from the display and becomes smaller as the pointing element is moving closer to the display. Other examples of pointing visual effects include a graphical element (static or animated) that is perceived to the user as located on the pointing element at the beginning of the pointing gestures and which moves together with the pointing element as it is moving closer to the display.

In the case of 3D display, the pointing visual effect may be perceived in one or more locations which are perceived to the user as located at different distances from the display.

Optionally system 2 can be configured to display different types of pointing visual effects. System 2 can be configured to allow a user to select (configure) which type or types of pointing visual effect is preferred. Alternatively or additionally, the selection (configuration) of desired pointing visual effects can be controlled by an application. For example pointing visual effects can be adapted to the graphical elements which are being displayed on the display.

According to one example, the pointing visual effect can be displayed on the display when a predefined pointing visual effect condition is met. The predefined pointing visual effect conditions can be related to the position of the pointing element in the viewing space, including for example, an estimated distance of the pointing element from the user's eyes, and a change in size of the pointing element. Alternatively or additionally, the predefined pointing visual effect conditions can be related to the motion path of the pointing element, including the time that has passed from the beginning of the pointing gesture, motion vectors values (e.g. position data components), detected changes in the speed of the pointing gesture along the motion path, decelerate of the pointing element along the motion path, estimated time until the pointing element is bound to reach point P'.

During the pointing gesture, for each location of the pointing element in the viewing space there is a respective point of intersection of a viewing ray with the plane. Thus, according to another example, the predefined pointing visual effect conditions may be related to the distribution of the intersection points on the plane (e.g. the pointing visual effect condition can be that the distance between the intersection points is less than a predefined value). In another example, the initial location of the pointing visual effect on the display can be determined based on the initial pointing direction of the pointing element.

During the pointing gesture, the motion path of the pointing element towards the display is traced (block 1107). While tracing the pointing element a respective sequence of position data components can be obtained as described above with reference to block 905 in FIG. 9.

As the pointing element is moving closer towards the display, one or more characteristics of the pointing visual effect are altered in correlation to the movement of the pointing element (block 1009). The characteristics can include for example, the location, shape, size, color, brightness and transparency level of the pointing visual effect or any other characteristic. For instance, the pointing visual effect can diminish in size as the distance between the pointing element and the display shortens.

As the user extends his arm towards the display, he intuitively attempts to move the pointing visual effect towards the position of a desired graphical element displayed on the display. The processing unit is configured to identify the rectifying movements of the pointing element which are made by the user, in attempt to move the pointing visual effect towards the selected graphical element. Optionally, the processing unit can be configured to change the position of the pointing visual effect on the display based on the identified rectifying movement of the pointing element performed by the user. For example, the position of the pointing visual effect on the display can change in correlation to the direction of the rectifying gestures which are made by the user.

Figure 12A:
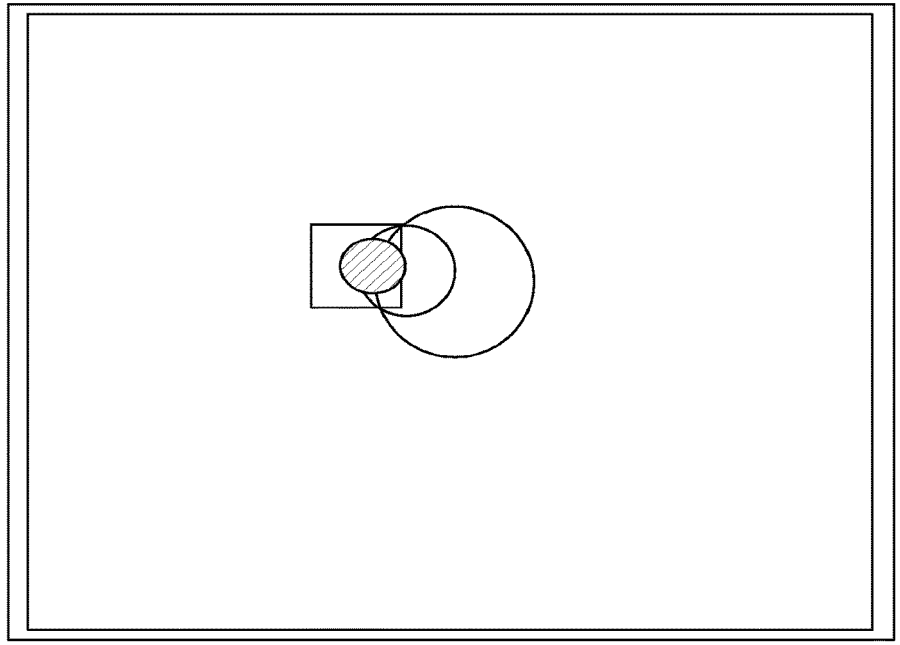
FIGS. 12a and 12b are schematic illustrations an example of changes in characteristics of a pointing visual effect responsive to pointing gesture of a user, in accordance with the presently disclosed subject matter.
Figure 12B:
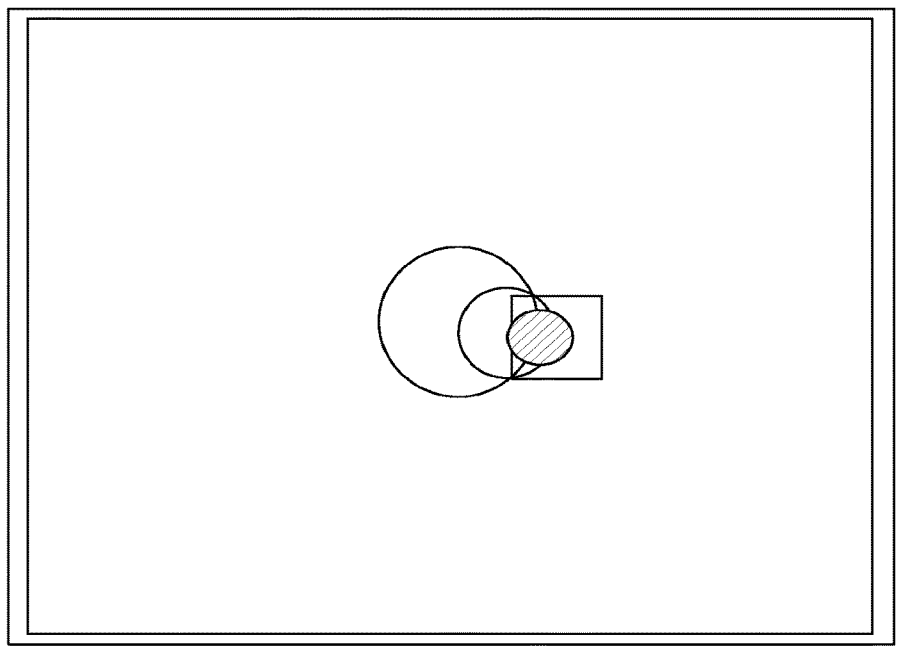

In another example, a circular pointing visual effect becomes smaller as the pointing element is moving closer towards the display. Optionally the pointing visual effect can shrink in the direction of the rectifying gesture. FIG. 12a illustrates a pointing visual effect which is shrunk in size and migrates to the left, responsive to a rectifying gesture towards an icon (indicated by a square) located on the left and FIG. 12b illustrates a pointing visual effect which is shrunk in size and migrates to the right, responsive to a rectifying gesture towards an icon (indicated by the square), located on the right.

Using the known position of the pointing visual effect on the display and possibly also on the direction of the movement of pointing element, a graphical element such as an icon which complies with a predefined criterion with respect to the pointing visual effect, can be identified and determined as a selected icon (block 1013). For example, an icon which is located closest to the pointing visual effect or which is located relative to the pointing visual effect in the direction of the rectifying gesture, can be determined as the icon selected by the user.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A method of recognizing an aimed point or area in a viewing space of a display device, the method comprising:
   obtaining, using an image sensor, at least one image of the viewing space;
   processing the at least one image by at least one processor operatively connected to the image sensor and obtaining data indicative of a location of at least one pointing element in the viewing space;
   obtaining data indicative of a location of at least one predefined body part of a user in the viewing space;
   determining by the at least one processor, a location of the aimed point or area in the viewing space using a combination of:
      the data indicative of the location of the at least one pointing element,
      the data indicative of the location of the at least one predefined body part, and
      features with respect to a motion path of the pointing element during a pointing gesture;
   determining the aimed point or area, while obtaining the data indicative of the location of at least one pointing element in the viewing space;
   detecting a change in an estimated time until the pointing element will reach a point in the viewing space where the pointing element is closest to the aimed point or area during the pointing gesture;
   determining a change in a motion vector of the pointing element during the pointing gesture, wherein the change in the motion vector relates to a change in a direction of the motion vector in a vertical axis; and
   executing a predefined command or message associated with at least the aimed point or area and the change in the motion vector.

2. The method of claim 1, wherein the viewing space comprises a three-dimensional viewing space, and the data indicative of a location of at least one pointing element includes x, y, and z coordinates.

3. The method of claim 1, further comprising detecting a change in a speed of the pointing element along the motion path.

4. The method of claim 1, further comprising detecting a deceleration of the pointing element along the motion path.

5. The method of claim 1, further comprising:
   displaying at least one graphical element in the viewing space; and
   identifying, by the at least one processor, a given graphical element from the at least one displayed graphical element, using data indicative of the location of the aimed point or area in the viewing space.

6. The method of claim 1, further comprising:
   determining the location of the pointing element using location features extracted from the motion path of the pointing element during the pointing gesture.

7. The method of claim 1, wherein:
   the features with respect to a motion path of the pointing element further include a plurality of selected position data components of the at least one pointing element during the pointing gesture, which comply with a predefined criterion, the method further comprising:
   for each given position data component in the plurality of selected position data components, determining a respective viewing ray, the respective viewing ray extending from the location of the at least one predefined body part, through the location of the at least one pointing element, and intersecting a plane on which at least one graphical element is displayed, thus yielding a respective candidate plane, wherein the location of the at least one pointing element corresponds to the given position data component;
   determining an overlapping area between the respective candidate planes; and
   determining the aimed point or area using data indicative of the overlapping area.

8. The method of claim 1, wherein the image sensor is a proximity sensor.

9. The method of claim 1, further comprising determining a clicking gesture.

10. A non-transitory computer readable medium storing instructions which, when executed, cause at least one processor to perform operations for recognizing an aimed point or area in a viewing space of a display device, the operations comprising:
   obtaining, using an image sensor, at least one image of the viewing space;
   processing the at least one image by at least one processor operatively connected to the image sensor and obtaining data indicative of a location of at least one pointing element in the viewing space;
   obtaining data indicative of a location of at least one predefined body part of a user in the viewing space;
   determining a location of the aimed point or area in the viewing space using a combination of:
      the data indicative of the location of the at least one pointing element,
      the data indicative of the location of the at least one predefined body part, and
      features with respect to a motion path of the pointing element during a pointing gesture;
   determining the aimed point or area, while obtaining the data indicative of the location of at least one pointing element in the viewing space;
   detecting a change in an estimated time until the pointing element will reach a point in the viewing space where the pointing element is closest to the aimed point or area during the pointing gesture;
   determining a change in a motion vector of the pointing element during the pointing gesture, wherein the change in the motion vector relates to a change in a direction of the motion vector in a vertical axis; and executing a predefined command or message associated with at least the aimed point or area and the change in the motion vector.

11. The computer readable medium of claim 10, wherein the viewing space comprises a three-dimensional viewing space, and the data indicative of a location of at least one pointing element includes x, y, and z coordinates.

12. The computer readable medium of claim 10, the operations further comprising:
displaying at least one graphical element in the viewing space; and
identifying, by the at least one processor, a given graphical element from the at least one displayed graphical element, using data indicative of the location of the aimed point or area in the viewing space.

13. The computer readable medium of claim 10, the operations further comprising:
determining the location of the pointing element using location features extracted from the motion path of the pointing element during the pointing gesture.

14. The computer readable medium of claim 10, wherein:
the features with respect to a motion path of the pointing element further include a plurality of selected position data components of the at least one pointing element during the pointing gesture, which comply with a predefined criterion, the method further comprising:
for each given position data component in the plurality of selected position data components, determining a respective viewing ray, the respective viewing ray extending from the location of the at least one predefined body part, through the location of the at least one pointing element, and intersecting a plane on which at least one graphical element is displayed, thus yielding a respective candidate plane, wherein the location of the at least one pointing element corresponds to the given position data component;
determining an overlapping area between the respective candidate planes; and
determining the aimed point or area using data indicative of the overlapping area.

15. The computer readable medium of claim 10, wherein the image sensor is a proximity sensor.

16. The computer readable medium of claim 10, the operations further comprising determining a clicking gesture.

17. A system for recognizing an aimed point or area in a viewing space of a display device, the system comprising:
at least one processor configured to:
obtain, using an image sensor, at least one image of the viewing space;
process the at least one image and obtain data indicative of a location of at least one pointing element in the viewing space;
obtain data indicative of a location of at least one predefined body part of a user in the viewing space;
determine a location of the aimed point or area in the viewing space using a combination of:
the data indicative of the location of the at least one pointing element,
the data indicative of the location of the at least one predefined body part, and
features with respect to a motion path of the pointing element during a pointing gesture;
determine the aimed point or area, while obtaining the data indicative of the location of at least one pointing element in the viewing space;
detect a change in an estimated time until the pointing element will reach a point in the viewing space where the pointing element is closest to the aimed point or area during the pointing gesture;
determine a change in a motion vector of the pointing element during the pointing gesture, wherein the change in the motion vector relates to a change in a direction of the motion vector in a vertical axis; and
execute a predefined command or message associated with at least the aimed point or area and the change in the motion vector.

18. The system of claim 17, wherein the viewing space comprises a three-dimensional viewing space, and the data indicative of a location of at least one pointing element includes x, y, and z coordinates.

19. The system of claim 17, the at least one processor being further configured to:
determine the location of the pointing element using location features extracted from the motion path of the pointing element during the pointing gesture,
wherein the features with respect to a motion path of the pointing element further include a plurality of selected position data components of the at least one pointing element during the pointing gesture.

20. A method of recognizing an aimed point or area in a viewing space of a display device, the method comprising:
obtaining, using an image sensor, at least one image of the viewing space;
processing the at least one image by at least one processor operatively connected to the image sensor and obtaining data indicative of a location of at least one pointing element in the viewing space;
obtaining data indicative of a location of at least one predefined body part of a user in the viewing space;
determining by the at least one processor, a location of the aimed point or area in the viewing space using a combination of:
the data indicative of the location of the at least one pointing element,
the data indicative of the location of the at least one predefined body part, and
features with respect to a motion path of the pointing element during a pointing gesture, wherein the motion path is associated with a speed of the pointing gesture;
determining the aimed point or area, while obtaining the data indicative of the location of at least one pointing element in the viewing space, wherein the determined aimed point or area is associated with the location of the pointing element while the speed of the pointing gesture is at a minimum;
detecting a change in an estimated time until the pointing element will reach a point in the viewing space where the pointing element is closest to the aimed point or area during the pointing gesture; and
executing a predefined command or message associated with the aimed point or area.

* * * * *